United States Patent
Nojiri et al.

(10) Patent No.: US 11,493,356 B2
(45) Date of Patent: Nov. 8, 2022

(54) DIRECTION INDICATOR CONTROL METHOD AND DIRECTION INDICATOR CONTROL DEVICE

(71) Applicant: Nissan Motor Co., Ltd., Yokohama (JP)

(72) Inventors: Takahiro Nojiri, Kanagawa (JP); Tatsuya Shino, Kanagawa (JP); Katsuhiko Degawa, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 35 days.

(21) Appl. No.: 16/625,448

(22) PCT Filed: Jun. 26, 2017

(86) PCT No.: PCT/JP2017/023422
§ 371 (c)(1),
(2) Date: Dec. 20, 2019

(87) PCT Pub. No.: WO2019/003278
PCT Pub. Date: Jan. 3, 2019

(65) Prior Publication Data
US 2020/0363228 A1     Nov. 19, 2020

(51) Int. Cl.
*G01C 21/36* (2006.01)
*B60R 11/04* (2006.01)

(52) U.S. Cl.
CPC ..... *G01C 21/3632* (2013.01); *G01C 21/3658* (2013.01); *B60R 11/04* (2013.01)

(58) Field of Classification Search
CPC .................................................. G01C 21/3632
See application file for complete search history.

(56) References Cited

U.S. PATENT DOCUMENTS

| 5,839,086 A | 11/1998 | Hirano |
| 6,108,604 A | 8/2000 | Fukaya et al. |
| 10,011,216 B1* | 7/2018 | Rovik .................. G06V 20/588 |
| 2006/0217882 A1* | 9/2006 | Takashima ......... G01C 21/3632 |
| | | 701/457 |

(Continued)

FOREIGN PATENT DOCUMENTS

| EP | 1731875 A1 | 12/2006 |
| JP | H08-86662 A | 4/1996 |

(Continued)

OTHER PUBLICATIONS

Machine translation for WO2008125392, Cado Jean-Pierre, Oct. 23, 2008.*

(Continued)

*Primary Examiner* — Faris S Almatrahi
*Assistant Examiner* — Abdalla A Khaled
(74) *Attorney, Agent, or Firm* — Young Basile Hanlon & MacFarlane, P.C.

(57) ABSTRACT

A direction indicator control unit obtains a position of an entry road and a position of an exit road of a roundabout determined to be present on a presumed traveling route of a vehicle, and determines a necessity of directional indication when entering the roundabout in accordance with a relationship between the position of the entry road and the position of the exit road.

8 Claims, 7 Drawing Sheets

(56) References Cited

U.S. PATENT DOCUMENTS

| | | | | |
|---|---|---|---|---|
| 2007/0150182 | A1* | 6/2007 | Okusa | G01C 21/3658 |
| | | | | 340/995.13 |
| 2016/0068099 | A1* | 3/2016 | Peterson | B60Q 1/34 |
| | | | | 701/36 |
| 2016/0167570 | A1* | 6/2016 | Raubvogel | G01S 19/42 |
| | | | | 701/408 |
| 2017/0080853 | A1* | 3/2017 | Raghu | G06V 20/56 |
| 2017/0103653 | A1* | 4/2017 | Satomura | G08G 1/04 |

FOREIGN PATENT DOCUMENTS

| | | |
|---|---|---|
| JP | H10-129342 A | 5/1998 |
| JP | H10-172770 A | 6/1998 |
| JP | 2001-018708 A | 1/2001 |
| JP | 2001-336944 A | 12/2001 |
| JP | 2005-292040 A | 10/2005 |
| JP | 2007-017266 A | 1/2007 |
| JP | 2009-115530 A | 5/2009 |
| JP | 2012-149957 A | 8/2012 |
| JP | 2016-138866 A | 8/2016 |
| JP | 2017-088161 A | 5/2017 |
| WO | 2008125392 A1 | 10/2008 |

OTHER PUBLICATIONS

Nagano-Ken Keisatsu, Kanjo Kosaten (Roundabout) 1-4 no Kotsu Hoho nl Tsuite, Mar. 5, 2015 (Mar. 5, 2015), [retrieval date Aug. 8, 2017 (Aug. 8, 2017)], Internet URL: http://www.pref.nagano.lg.jp/police/anshin/koutsu/roundabout.html; with translation; 7 pages.

National Transport Commission, Auslialian Road Rules [online], Feb. 2012, National Road Transport Commission, [retrieval date Aug. 2017. 0 8 J , ISBN 0 7240 8874 1, Internet: URL: https://www.ntc.gov.au/Media/Reports/(F1D63B25-98A0-8E5A-EBD4-BA6FC69ABF7D) .pdf, p. 100-108; 373 pages.

Hjfocus "Do you know how to use the correct roundabout?", Jun. 22, 2017, 2 pages, retrieved from URL: http://www.hjfocus.com/news/articleView.html?idxno=583.

"Roundabout Basics", Oct. 24, 2015, 8 pages, retrieved from URL: https://www.youtube.com/watch?v=35XgSJ-nSdo.

* cited by examiner

DIRECTION INDICATOR CONTROL METHOD AND DIRECTION INDICATOR CONTROL DEVICE

TECHNICAL FIELD

The present invention relates to a direction indicator control method and a direction indicator control device.

BACKGROUND

Route guiding technology at a circular intersection is known that displays an arrow indicating a traveling direction toward a road to exit at each point branching into the corresponding connected road. See, for example, Japanese Unexamined Patent Application Publication No. 2001-336944.

SUMMARY

The above technology relates to the route guidance at the circular intersection referred to as a roundabout. The rules at a roundabout typically differ from the rules at other intersections such as a crossroads. The above technology may not be applicable to directional indication at a roundabout while following the rules of the roundabout.

To solve the above conventional problem, the present invention provides a direction indicator control method and a direction indicator control device enabling directional indication following rules of a corresponding roundabout.

A direction indicator control method according to an aspect of the present invention obtains a position of an entry road and a position of an exit road of a roundabout determined to be present on a presumed traveling route of a vehicle, and determines a necessity of directional indication when entering the roundabout in accordance with a relationship between the position of the entry road and the position of the exit road.

The present invention enables the directional indication following rules of a corresponding roundabout.

DETAILED DESCRIPTION

An embodiment of the present invention will be described in detail below with reference to the drawings. The same elements are indicated by the same reference numerals, and overlapping explanations are not repeated below.

Figure 1:
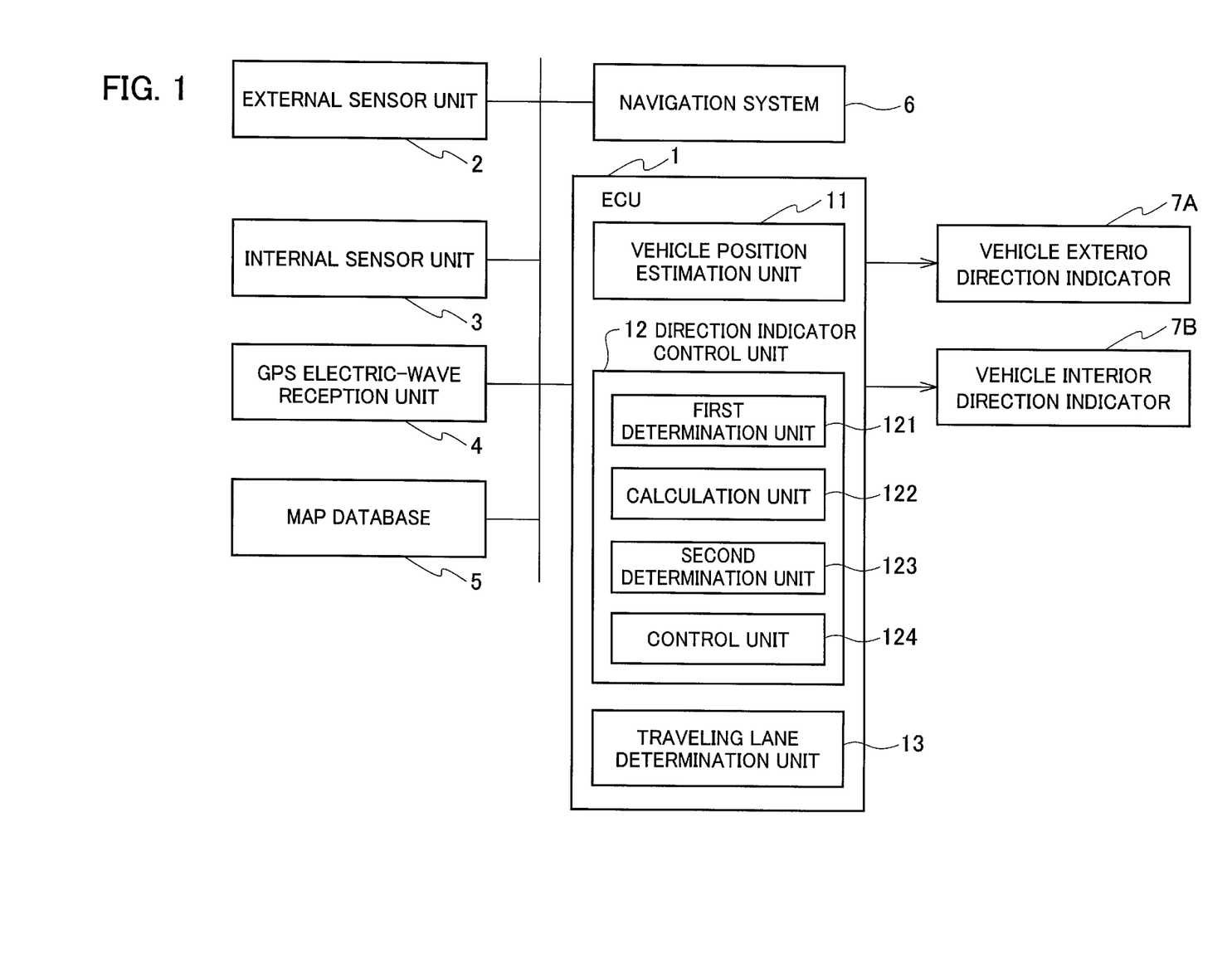
FIG. 1 is a functional block diagram illustrating part of a vehicle equipped with a direction indicator control device according to an embodiment of the present invention.

A vehicle shown in FIG. 1 includes an electronic control unit (ECU) 1, an external sensor unit 2, an internal sensor unit 3, a global positioning system (GPS) electric-wave reception unit 4, a map database 5, a navigation system 6, a vehicle exterior direction indicator 7A, and a vehicle interior direction indicator 7B. The vehicle shown in FIG. 1 is referred to as a "host vehicle" as necessary so as not to be confounded with other vehicles. The vehicle exterior direction indicator 7A and the vehicle interior direction indicator 7B are also collectively referred to as "direction indicators".

The ECU 1, corresponding to a control unit (control circuit) in a direction indicator control device (control device), can be implemented by a microcomputer including a central processing unit (CPU), a memory, and an input-output unit. A computer program for fabricating the ECU is installed on the microcomputer and is executed, so that the microcomputer functions as the ECU 1. While the embodiment is illustrated with the case in which the software is installed to fabricate the ECU 1, dedicated hardware for executing each information processing as described below can be prepared to compose the ECU 1.

The external sensor unit 2 includes a radar unit or a camera (not shown) for acquiring surrounding information of the host vehicle so as to output the information to the ECU 1 and the navigation system 6.

The internal sensor unit 3 includes a velocity sensor or a yaw angle sensor (not shown) for acquiring a velocity or a yaw angle of the host vehicle so as to output the velocity and the yaw angle to the ECU 1 and the navigation system 6.

The GPS electric-wave reception unit 4 receives electric waves from three or more GPS satellites to acquire positional information indicating a position of the host vehicle, so as to output the positional information to the ECU 1 and the navigation system 6.

The map database 5 stores map information on an area in which the host vehicle is to travel so that the ECU 1 and the navigation system 6 refer to the map information. The map information includes information on positions of roads and intersections. Examples of intersections include a crossroads, a T-junction, and a circular intersection referred to as a roundabout.

The term "roundabout" is an intersection which is a circular road (loop road) in which three or more roads join up, and herein refers to a loop road. The map information includes information on a roundabout. The information on a roundabout includes a traveling direction of the host vehicle in the roundabout (clockwise direction or counterclockwise direction), and positions of the respective roads joining in the roundabout. The information on the positions of the respective roads includes azimuths between the roads when the traveling direction of the vehicle in the roundabout is defined as a positive direction on the basis of a predetermined direction (the north, for example) from the central position of the loop road.

The navigation system 6 is a device for guiding the host vehicle to a destination set by an occupant such as a driver. The navigation system 6 estimates a position of the host vehicle based on each piece of information output from the external sensor unit 2, the internal sensor unit 3, and the GPS electric-wave reception unit 4, calculates a presumed traveling route to a destination, and guides the host vehicle to the destination. The navigation system 6 outputs the information on the presumed traveling route to the ECU 1.

The ECU 1 includes a vehicle position estimation unit 11, a direction indicator control unit 12, and a traveling lane determination unit 13.

The vehicle position estimation unit 11 estimates a position of the host vehicle based on each piece of information output from the external sensor unit 2, the internal sensor unit 3, and the GPS electric-wave reception unit 4. The direction indicator control unit 12 corresponds to the control unit (control circuit) in the direction indicator control device (control device).

The direction indicator control unit 12 controls the vehicle exterior direction indicator 7A and the vehicle interior direction indicator 7B in accordance with the positional information of the host vehicle acquired by the vehicle position estimation unit 11, the map information in the map database 5, and the information on the presumed traveling route generated by the navigation system 6.

The direction indicator control unit 12 includes a first determination unit (first determination circuit) 121, a calculation unit (calculation circuit) 122, a second determination unit (second determination circuit) 123, and a control unit (control circuit) 124. The first determination unit 121 determines whether there is any roundabout along the presumed traveling route on which the host vehicle is to travel. The calculation unit 122 obtains an entry road through which the host vehicle enters the roundabout and an exit road through which the host vehicle exits from the roundabout when the roundabout is determined to be present on the presumed traveling route. The second determination unit 123 determines whether or not a directional indication is required by the direction indicators (7A and 7B) when the host vehicle enters the roundabout, in accordance with a relationship between the position of the entry road and the position of the exit road. The control unit 124 controls the vehicle exterior direction indicator 7A and the vehicle interior direction indicator 7B.

The vehicle exterior direction indicator 7A includes a right-turn signal and a left-turn signal installed in external parts of the host vehicle for indicating a right turn or a left turn of the host vehicle to other vehicles or pedestrians.

The vehicle interior direction indicator 7B includes a right-turn signal and a left-turn signal installed in the compartment of the host vehicle for indicating the right turn or the left turn to the occupant such as the driver.

The direction indicator control unit 12 controls the vehicle exterior direction indicator 7A and the vehicle interior direction indicator 7B so as to turn on the respective right-turn signals while the respective left-turn signals are in the OFF state. Similarly, the direction indicator control unit 12 controls the vehicle exterior direction indicator 7A and the vehicle interior direction indicator 7B so as to turn on the respective left-turn signals while the respective right-turn signals are in the OFF state. The vehicle exterior direction indicator 7A and the vehicle interior direction indicator 7B are thus operated synchronously.

The traveling lane determination unit 13 determines whether the host vehicle is traveling in an appropriate lane in accordance with the positional relationship between the road through which the host vehicle enters the roundabout (the entry road) and the road through which the host vehicle exits from the roundabout (the exit road), when the entry road includes a plurality of lanes.

A direction indicator control method executed by the direction indicator control unit 12 is described below with reference to FIG. 2. The following is control processing according to the embodiment in a case in which the direction indicators are presumed to be controlled so as to provide the directional indication toward a direction in which the vehicle is to travel when the vehicle is entering a point at which roads join together. For example, when the presumed traveling route includes an intersection at which the host vehicle is to turn to the right, the direction indicators on the right side are automatically operated in front of the intersection. The embodiment is illustrated with a case in which the host vehicle is traveling in accordance with the guidance by the navigation system 6 based on the information on the presumed traveling route.

Figure 2:
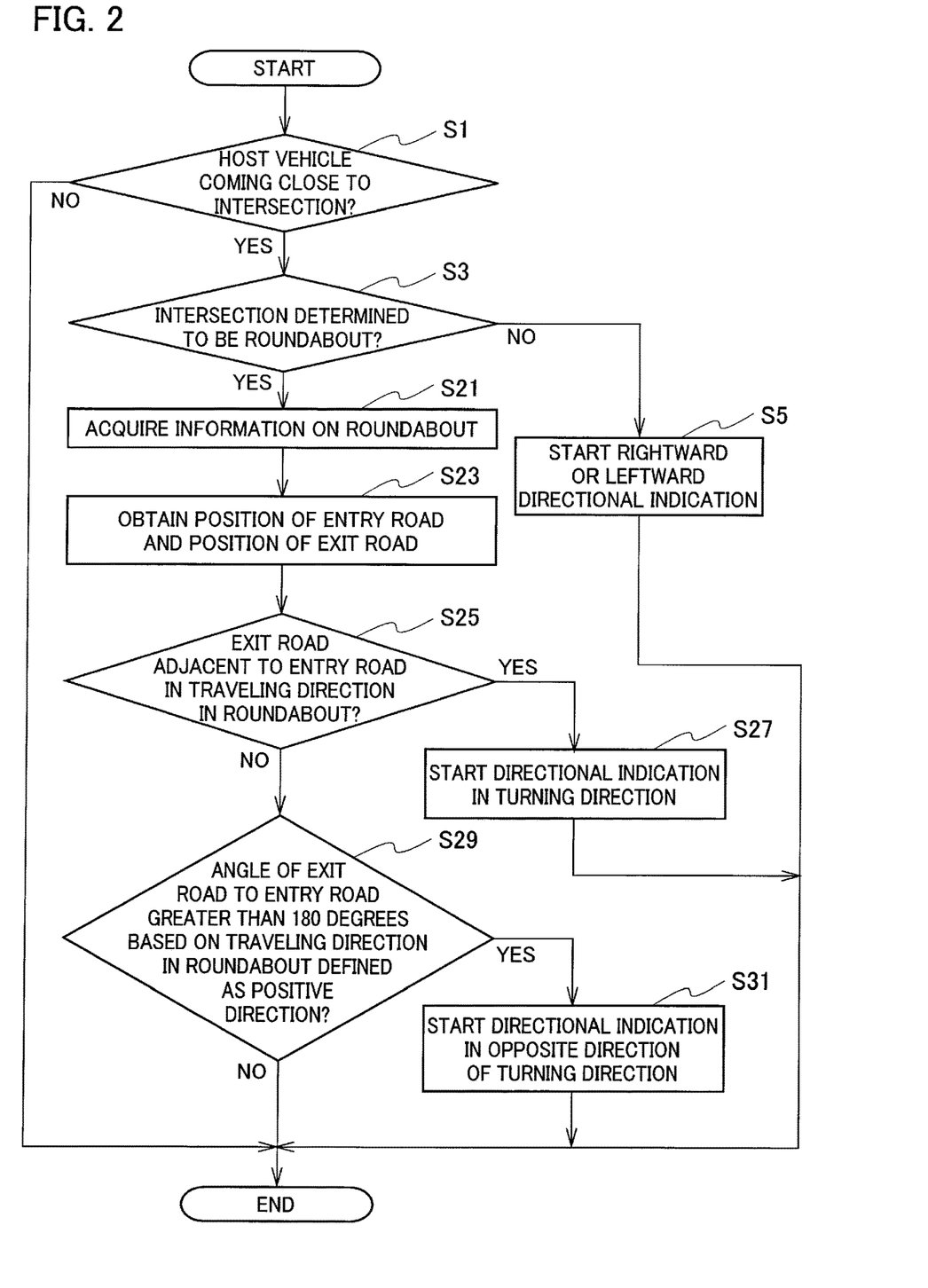
FIG. 2 is a flowchart for explaining a direction indicator control method executed by a direction indicator control unit 12.

As shown in FIG. 2, the direction indicator control unit 12 first determines whether the host vehicle is coming close to an intersection in accordance with the position of the host vehicle estimated by the vehicle position estimation unit 11 and the map information of the map database 5 (S1). The process ends when the host vehicle is still not close to the intersection (S1: NO).

When the host vehicle is coming close to the intersection (S1: YES), the first determination unit 121 determines whether the intersection is a roundabout (S3). Namely, the first determination unit 121 determines whether a roundabout is present along the presumed traveling route on which the host vehicle is presumed to travel.

When the intersection is not a roundabout (S3: NO), the control unit 124 of the direction indicator control unit 12 directs the vehicle exterior direction indicator 7A and the vehicle interior direction indicator 7B to start the rightward or leftward directional indication (S5) to end the process. In particular, in step S5, the control unit 124 directs the vehicle exterior direction indicator 7A and the vehicle interior direction indicator 7B to start the rightward directional indication when turning to the right at the intersection, and directs the vehicle exterior direction indicator 7A and the vehicle interior direction indicator 7B to start the leftward directional indication when turning to the left at the intersection (S5). The vehicle exterior direction indicator 7A and the vehicle interior direction indicator 7B then turn on the right-turn signals when turning to the right at the intersection, and turn on the left-turn signals when turning to the left at the intersection.

When the intersection is a roundabout (S3: YES), namely, when a roundabout is determined to be present on the presumed traveling route, the direction indicator control unit 12 acquires the information on the roundabout from the map information (S21).

The calculation unit 122 of the direction indicator control unit 12 then obtains a position of a road through which the host vehicle enters the roundabout (referred to as an entry road) and a position of a road through which the host vehicle exits from the roundabout (referred to as an exit road), in accordance with the information on the roundabout and the information on the presumed traveling route (S23). The position of the entry road and the position of the exit road may be designated by the occupant.

The second determination unit 123 of the direction indicator control unit 12 then determines whether the vehicle exterior direction indicator 7A and the vehicle interior direction indicator 7B need to make a directional indication when the host vehicle enters the roundabout, in accordance with the relationship between the position of the entry road and the position of the exit road.

In particular, the second determination unit 123 of the direction indicator control unit 12 determines whether the exit road is adjacent to the entry road in the traveling direction in the roundabout (S25). For example, the direction indicator control unit 12 calculates azimuths (positive angles) of the respective roads (including the exit road) other than the entry road which is presumed to have an azimuth set to zero (degrees), so as to make the determination based on the respective azimuths (S25).

The determination process is described in more detail below with reference to FIG. 3. The respective roads R1 to R5 join in the roundabout RA. The traveling direction in the roundabout RA is presumed to be the clockwise direction. The road R1 is presumed to be the entry road.

Figure 3:
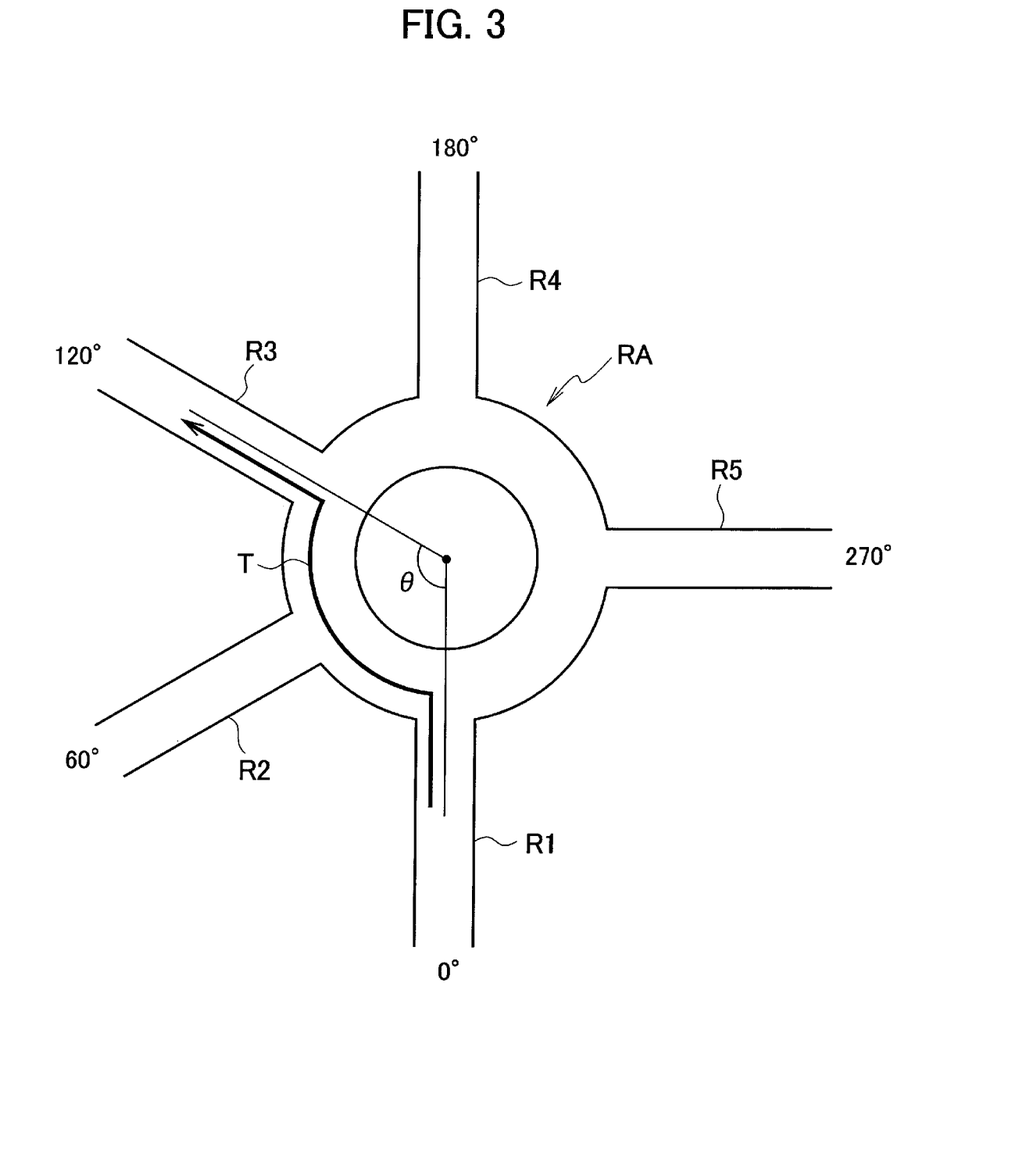
FIG. 3 is a diagram for explaining an azimuth between roads joining in a roundabout.

The respective roads R2 to R5 shown in FIG. 3 are sequentially arranged such that the road R2 has an azimuth of 60 degrees, the road R3 has an azimuth of 120 degrees, the road R4 has an azimuth of 180 degrees, and the road R5 has an azimuth of 270 degrees, on the basis of the road R1 having the azimuth set to zero degrees. The host vehicle is to travel along the arrow T when the road R3 is presumed to be the exit road. The azimuth of the exit road is the angle of θ shown in FIG. 3, which is 120 degrees.

Returning to FIG. 2, the exit road when having the smallest azimuth among the other calculated azimuths is determined to be adjacent to the entry road in the traveling direction (FIG. 2, S25: YES).

When the exit road is determined to be adjacent to the entry road in the traveling direction (S25: YES), the control unit 124 of the direction indicator control unit 12 directs the vehicle exterior direction indicator 7A and the vehicle interior direction indicator 7B to start the directional indication toward the direction to which the host vehicle is to turn when exiting from the roundabout (S27) to end the process. The direction to which the vehicle is to turn when exiting from the roundabout is hereinafter referred to as a "turning direction". The turning direction is a direction in which the vehicle is to turn to enter the exit road from the roundabout. The direction indicator control unit 12 executes the processing in step S27 when still present in the entry road before entering the roundabout.

The turning direction is the leftward direction when the traveling direction is the clockwise direction, and the turning direction is the rightward direction when the traveling direction is the counterclockwise direction. In step S27, the vehicle exterior direction indicator 7A and the vehicle interior direction indicator 7B turn on the left-turn signals when the traveling direction is the clockwise direction, and turn on the right-turn signals when the traveling direction is the counterclockwise direction. The host vehicle then enters the roundabout with the respective turn signals remaining turned on.

When the exit road is determined not to be adjacent to the entry road in the traveling direction (S25: NO), the second determination unit 123 of the direction indicator control unit 12 then determines whether the angle of the exit road to the entry road is greater than 180 degrees on the basis of the traveling direction in the roundabout defined as a positive direction (S29).

In particular, the second determination unit 123 of the direction indicator control unit 12 determines whether the azimuth of the exit road (when the entry road is presumed to have the azimuth set to zero degrees) calculated in step S25 is greater than 180 degrees (S29).

When the angle of the exit road to the entry road is greater than 180 degrees (S29: YES), the control unit 124 of the direction indicator control unit 12 directs the vehicle exterior direction indicator 7A and the vehicle interior direction indicator 7B to start the directional indication toward the opposite direction of the turning direction (S31) to end the process. The direction indicator control unit 12 executes the processing in step S29 when still present in the entry road before entering the roundabout.

The opposite direction of the turning direction is the rightward direction when the traveling direction is the clockwise direction, and the opposite direction of the turning direction is the leftward direction when the traveling direction is the counterclockwise direction. In step S29, the vehicle exterior direction indicator 7A and the vehicle interior direction indicator 7B turn on the right-turn signals when the traveling direction is the clockwise direction, and turn on the left-turn signals when the traveling direction is the counterclockwise direction. The host vehicle then enters the roundabout with the respective turn signals remaining turned on.

When the angle of the exit road to the entry road is 180 degrees or less (S29: NO), the control unit 124 of the direction indicator control unit 12 does not direct the vehicle exterior direction indicator 7A or the vehicle interior direction indicator 7B to start the directional indication to end the process.

The host vehicle thus enters the roundabout with the respective turn signals remaining turned off. The direction indicator control unit 12 thus leads the direction indicators to suspend the directional indication when entering the roundabout, namely, inhibits the respective direction indicators from making any directional indication.

The direction indicator control unit 12 executes the process shown in FIG. 2 at each intersection along the presumed traveling route.

While the embodiment does not illustrate the step of stopping the directional indication in the flowchart shown in FIG. 2, the directional indication can be stopped at an appropriate timing based on the traffic regulations, such as at the timing after a predetermined lapse of time from the start of the directional indication, or at the timing after passing through the roundabout.

Next, the operation of the traveling lane determination unit 13 is described below.

When the entry road includes a plurality of lanes, and the processing in step S25 is determined to be YES, the traveling lane determination unit 13 determines whether the host vehicle is located in the lane toward the turning direction. The traveling lane determination unit 13 makes the determination of whether the entry road includes a plurality of lanes based on the map information.

When the traveling direction is the clockwise direction, the turning direction is the leftward direction, and the traveling lane determination unit 13 then determines whether the host vehicle is located in the left lane (the leftmost lane, for example).

When the traveling direction is the counterclockwise direction, the turning direction is the rightward direction, and the traveling lane determination unit 13 then determines whether the host vehicle is located in the right lane (the rightmost lane, for example).

When the host vehicle is determined not to be located in the lane toward the turning direction, the traveling lane determination unit 13 urges a lane change toward the turning direction by means of voice or an indication on the screen of the navigation system 6. This enables the host vehicle to enter the roundabout from the appropriate lane, which is the lane toward the turning direction. When the host vehicle is determined not to be located in the lane toward the turning direction, the direction indicator control unit 12 may also direct the respective direction indicators (7A and 7B) to make the rightward directional indication when the lane toward the turning direction is the right side, or to make the leftward directional indication when the lane toward the turning direction is the left side, as viewed from the lane in which the host vehicle is located.

When the entry road includes a plurality of lanes, and the processing in step S29 is determined to be YES, the traveling lane determination unit 13 determines whether the host vehicle is located in the lane toward the opposite direction of the turning direction.

When the traveling direction is the clockwise direction, the opposite direction of the turning direction is the rightward direction, and the traveling lane determination unit 13 then determines whether the host vehicle is located in the right lane (the rightmost lane, for example).

When the traveling direction is the counterclockwise direction, the opposite direction of the turning direction is the leftward direction, and the traveling lane determination unit 13 then determines whether the host vehicle is located in the left lane (the leftmost lane, for example).

When the host vehicle is determined not to be located in the lane toward the opposite direction of the turning direction, the traveling lane determination unit 13 urges a lane change toward the opposite direction of the turning direction by means of voice or an indication on the screen of the navigation system 6. This enables the host vehicle to enter the roundabout from the appropriate lane, which is the lane toward the opposite direction of the turning direction. When the host vehicle is determined not to be located in the lane toward the opposite direction of the turning direction, the direction indicator control unit 12 may also direct the respective direction indicators (7A and 7B) to make the rightward directional indication when the lane toward the opposite direction of the turning direction is the right side, or make the leftward directional indication when the lane toward the opposite direction of the turning direction is the left side, as viewed from the lane in which the host vehicle is located.

Next, specific examples of the directional indication and the lane determination are described below with reference to the drawings.

Figure 4:
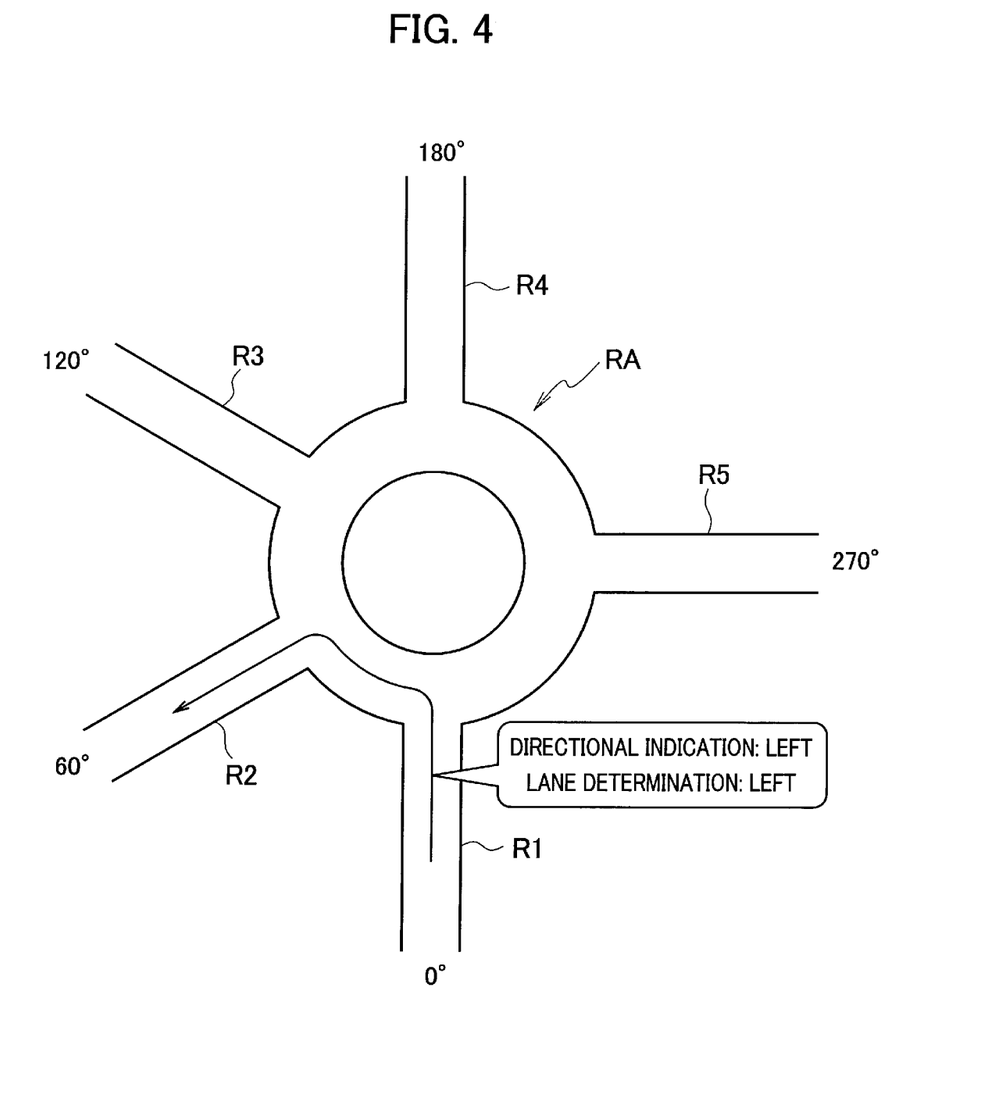
FIG. 4 is a diagram illustrating a specific example of directional indication and lane determination when an exit road is adjacent to an entry road.

As shown in FIG. 4, when the road R2 (the exit road) is adjacent to the road R1 (the entry road) in the traveling direction in the roundabout RA, the directional indication toward the turning direction (leftward in FIG. 4) is started in the road R1 (the entry road). This enables the host vehicle to follow the rules of the roundabout to start the directional indication toward the turning direction in the entry road when the exit road is adjacent to the entry road in the traveling direction. The host vehicle thus can be prevented from entering the roundabout without making any directional indication or while wrongly making the directional indication toward the opposite direction of the turning direction.

In addition, when the exit road is determined to be adjacent to the entry road in the traveling direction, as shown in FIG. 4, the host vehicle is then determined whether to be located in the lane toward the turning direction (the left lane in FIG. 4). The host vehicle is urged to make a lane change, for example, when not located in the lane toward the turning direction, so as to enter the roundabout from the appropriate lane.

Figure 5:
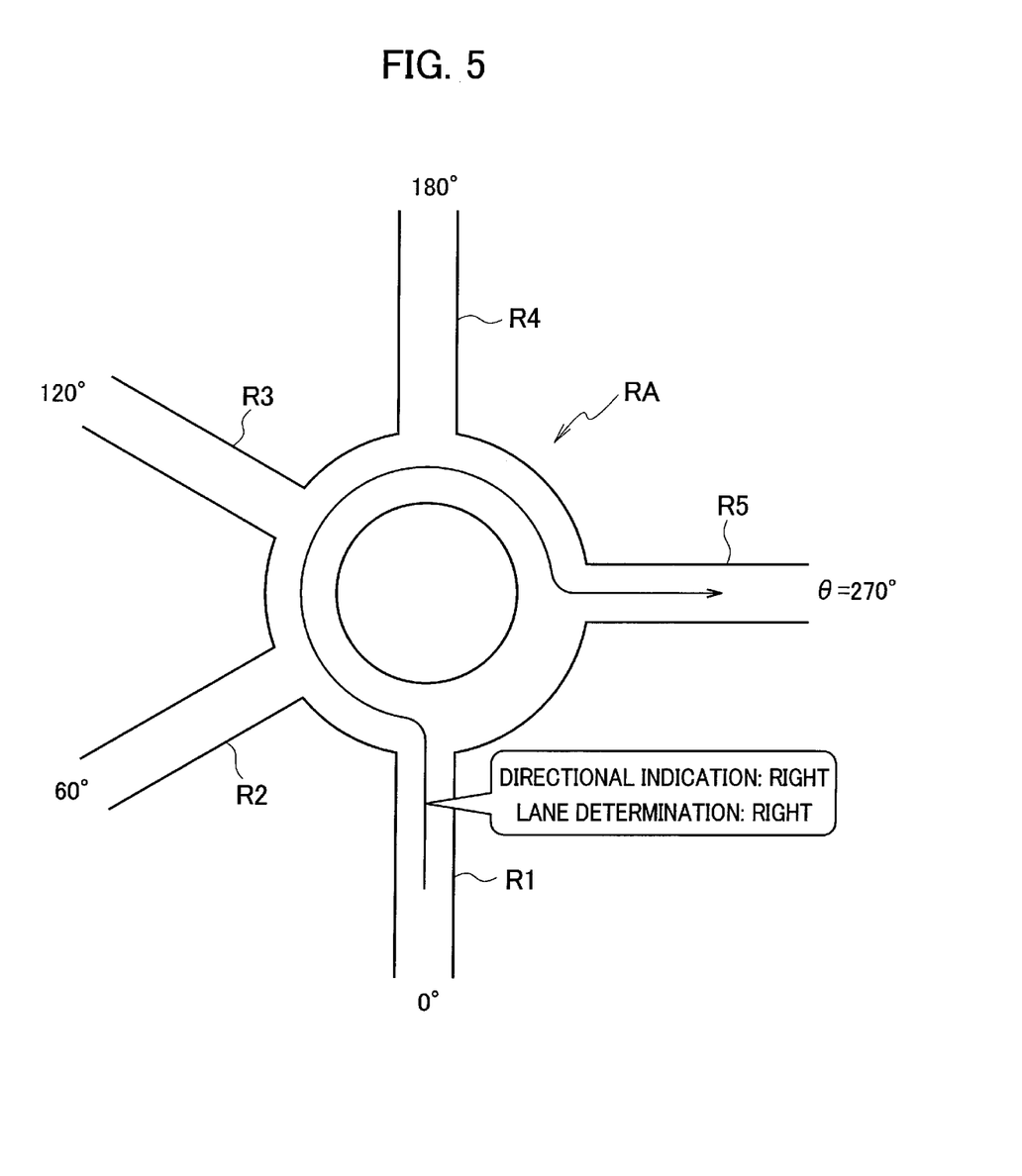
FIG. 5 is a diagram illustrating a specific example of directional indication and lane determination when an angle of an exit road to an entry road is greater than 180 degrees.

FIG. 5 illustrates a case in which the angle $\theta$ of the road R5 (the exit road) to the road R1 (the entry road) is greater than 180 degrees, which is 270 degrees in this case, on the basis of the traveling direction in the roundabout RA defined as a positive direction. The directional indication in this case toward the opposite direction of the turning direction (rightward in FIG. 5) is started in the road R1 (the entry road). This enables the host vehicle to follow the rules of the roundabout to start the directional indication toward the opposite direction of the turning direction in the entry road when the angle $\theta$ is greater than 180 degrees. The host vehicle thus can be prevented from entering the roundabout without making any directional indication or while wrongly making the directional indication toward the turning direction.

In addition, when the angle $\theta$ is greater than 180 degrees, as shown in FIG. 5, the host vehicle is then determined whether to be located in the lane toward the opposite direction of the turning direction (the right lane in FIG. 5). The host vehicle is urged to make a lane change, for example, when not located in the lane toward the opposite direction of the turning direction, so as to enter the roundabout from the appropriate lane.

Figure 6:
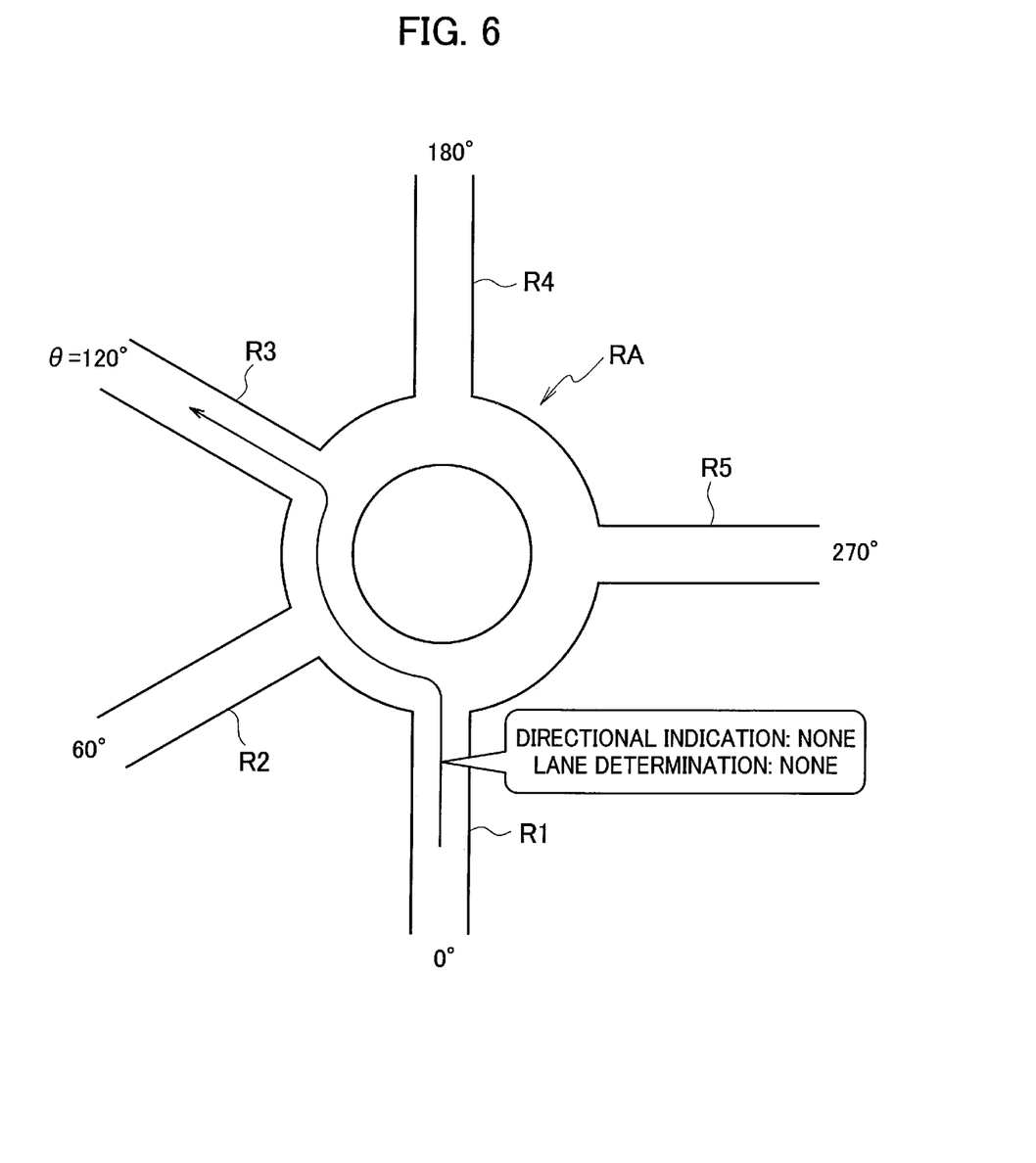
FIG. 6 is a diagram illustrating a first specific example of directional indication and lane determination when an angle of an exit road to an entry road not adjacent to each other is 180 degrees or less.
Figure 7:
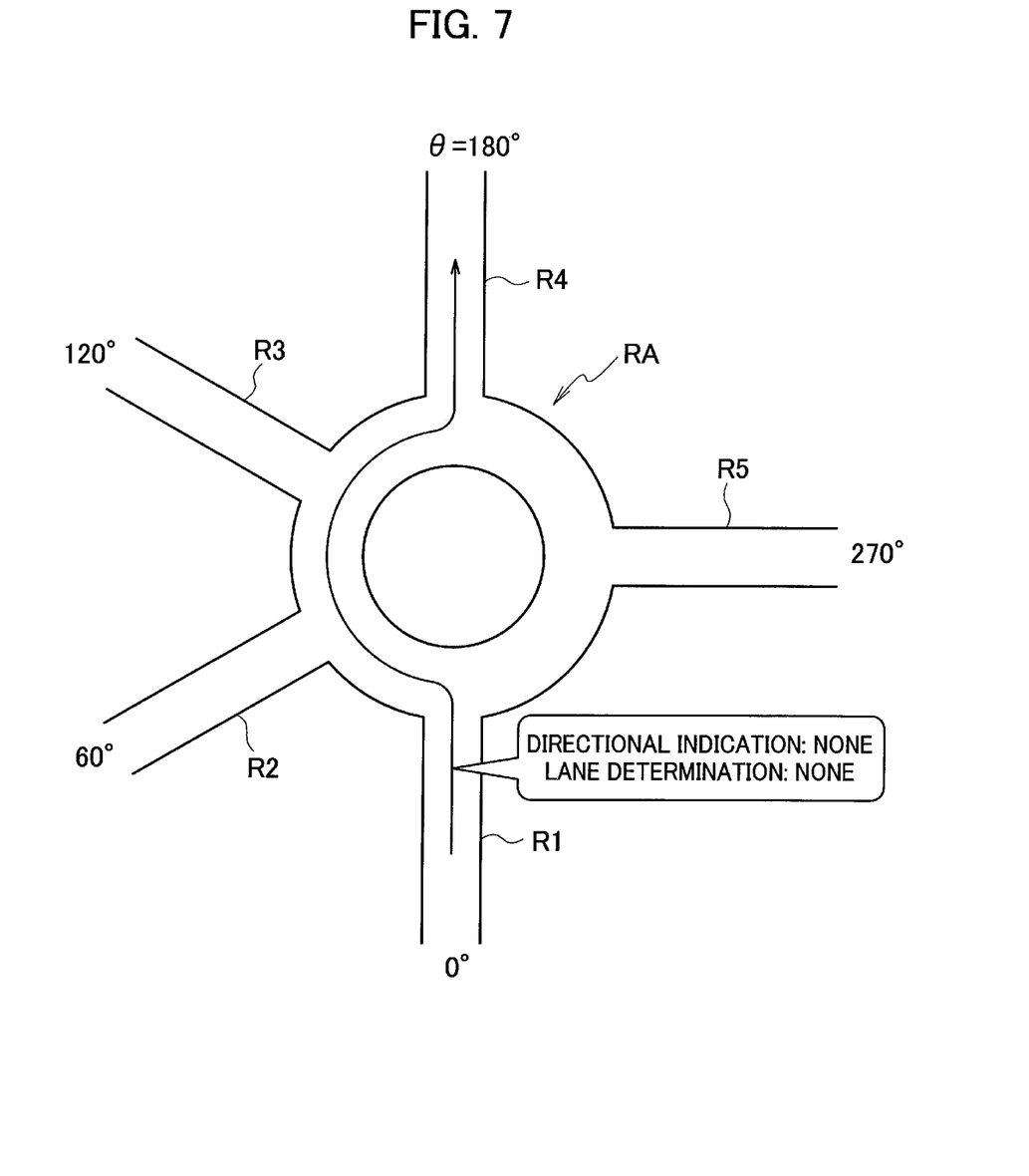
FIG. 7 is a diagram illustrating a second specific example of directional indication and lane determination when an angle of an exit road to an entry road not adjacent to each other is 180 degrees or less.

FIG. 6 and FIG. 7 each illustrate a case in which the angle $\theta$ of the exit road (the road R3 in FIG. 6 and the road R4 in FIG. 7) to the road R1 (the entry road) is 180 degrees or less on the basis of the traveling direction in the roundabout RA defined as a positive direction, and in which the exit road (R3, R4) is not adjacent to the entry road (R1) in the traveling direction in the roundabout RA. Each case does not allow any directional indication when the host vehicle enters the roundabout RA. This enables the host vehicle to follow the rules of the roundabout to suspend the directional indication when the angle $\theta$ is 180 degrees or less and the exit road is not adjacent to the entry road. The host vehicle thus can be prevented from entering the roundabout while making any directional indication.

The respective cases illustrated in FIG. 6 and FIG. 7 do not execute the determination of which lane the host vehicle is located. This enables the host vehicle to follow the rules of the roundabout to travel in any lane when the angle $\theta$ is 180 degrees or less and the exit road is not adjacent to the entry road.

FIG. 4 to FIG. 7 each illustrate the specific example of the roundabout in which the vehicle is traveling in the clockwise direction. When the vehicle travels in the counterclockwise direction in the roundabout, the road R5 to the road R2 are to sequentially have the angles $\theta$ of 90 degrees, 180 degrees, 240 degrees, and 300 degrees. The determination made in step S29 shown in FIG. 2 is thus based on the above respective angles $\theta$.

The present embodiment described above obtains the position of the entry road and the position of the exit road when the roundabout is present on the presumed traveling route, and determines the necessity of the directional indication when entering the roundabout in accordance with the relationship between the position of the entry road and the position of the exit road. The present embodiment thus enables the appropriate directional indication following the rules of the roundabout by determining the necessity of the directional indication upon the entry to the roundabout, based on the relationship between the position of the entry road and the position of the exit road.

The present embodiment has exemplified the case in which the direction indicator control device is mounted on the vehicle as a target for executing the directional indication. Alternatively, the direction indicator control device may be mounted on a server capable of communicating with the target vehicle, or mounted on any other vehicle not a target vehicle, so as to communicate necessary information and instructions between the server or any other vehicle and the target vehicle to remotely follow the similar direction indicator control method. The server and the target vehicle can communicate with each other through radio communication or vehicle-to-infrastructure communication. Any other vehicle and the target vehicle can communicate with each other through vehicle-to-vehicle communication. The direction indicators may blink when the control circuit is ON (turned on), and may be switched off when the control circuit is OFF. For example, the control circuit may be set to be turned off or keep the OFF state so as to suspend the directional indicators.

While the embodiment of the present invention has been described above, it should be understood that the present invention is not intended to be limited to the descriptions and the drawings composing part of this disclosure. Various alternative embodiments, examples, and technical applications will be apparent to those skilled in the art according to this disclosure.

REFERENCE SIGNS LIST

1 ECU
2 EXTERNAL SENSOR UNIT
3 INTERNAL SENSOR UNIT
4 GPS ELECTRIC-WAVE RECEPTION UNIT
5 MAP DATABASE
6 NAVIGATION SYSTEM
7A VEHICLE EXTERIOR DIRECTION INDICATOR (DIRECTION INDICATOR)
7B VEHICLE INTERIOR DIRECTION INDICATOR (DIRECTION INDICATOR)
11 VEHICLE POSITION ESTIMATION UNIT
12 DIRECTION INDICATOR CONTROL UNIT
13 TRAVELING LANE DETERMINATION UNIT
121 FIRST DETERMINATION UNIT
122 CALCULATION UNIT
123 SECOND DETERMINATION UNIT
124 CONTROL UNIT
RA ROUNDABOUT
R1 to R5 ROAD
θ AZIMUTH

The invention claimed is:

1. A turn signal control method comprising:
determining whether a vehicle is coming close to an intersection;
determining whether the intersection is a roundabout when the vehicle is determined to be close to the intersection;
obtaining a position of an entry road through which the vehicle enters the roundabout and a position of an exit road through which the vehicle will exit from the roundabout when the intersection is determined to be the roundabout;
determining whether a turn signal of the vehicle needs to make a directional indication when the vehicle enters the roundabout based on a relationship between the position of the entry road and the position of the exit road;
based on a determination that the turn signal of the vehicle needs to make the directional indication, controlling the turn signal of the vehicle to make the directional indication when the vehicle enters the roundabout; and
based on a determination that the turn signal of the vehicle does not need to make the directional indication, inhibiting the turn signal of the vehicle from making the directional indication when the vehicle enters the roundabout.

2. The turn signal control method according to claim 1, further comprising:
determining whether the exit road is adjacent to the entry road in a traveling direction in the roundabout; and
directing the turn signal to start the directional indication toward a direction to which the vehicle turns to exit from the roundabout when the exit road is determined to be adjacent to the entry road in the traveling direction in the roundabout.

3. The turn signal control method according to claim 1, further comprising:
determining whether the exit road is adjacent to the entry road in a traveling direction in the roundabout;
when the entry road includes a plurality of lanes and the exit road is determined to be adjacent to the entry road in the traveling direction in the roundabout, determining whether the vehicle is located in one of the lanes toward a direction to which the vehicle turns to exit from the roundabout; and
directing the turn signal to make the directional indication toward a corresponding lane when the vehicle is determined not to be located in the corresponding lane.

4. The turn signal control method according to claim 1, further comprising:
determining whether an angle of the exit road to the entry road is greater than 180 degrees when a traveling direction in the roundabout is defined as a positive direction; and
directing the turn signal to start the directional indication toward an opposite direction of a direction to which the vehicle turns to exit from the roundabout when the angle is determined to be greater than 180 degrees.

5. The turn signal control method according to claim 1, further comprising:
determining whether an angle of the exit road to the entry road is greater than 180 degrees when a traveling direction in the roundabout is defined as a positive direction;
when the entry road includes a plurality of lanes and the angle is determined to be greater than 180 degrees, determining whether the vehicle is located in one of the lanes toward an opposite direction of a direction to which the vehicle turns to exit from the roundabout; and
directing the turn signal to make the directional indication toward the corresponding lane when the vehicle is determined not to be located in the corresponding lane.

6. The turn signal control method according to claim 1, further comprising:
leading the turn signal to suspend the directional indication when the vehicle enters the roundabout, when an angle of the exit road to the entry road is 180 degrees or less when a traveling direction in the roundabout is defined as a positive direction, and the exit road is not adjacent to the entry road in the traveling direction in the roundabout.

7. The turn signal control method according to claim 1, wherein a direction of the directional indication is reversely switched depending on whether a traveling direction in the roundabout is a clockwise direction or a counterclockwise direction.

8. A control device for controlling a turn signal that is mounted on or in a vehicle, the control device comprising a control circuit configured to:
determine whether an intersection to which the vehicle is coming close is a roundabout;
obtain an entry road through which the vehicle enters the roundabout and an exit road through which the vehicle exits from the roundabout when the intersection to which the vehicle is coming close is the roundabout;

determine whether the turn signal needs to make a directional indication when the vehicle enters the roundabout, in accordance with a relationship between a position of the entry road and a position of the exit road;

control the turn signal to make the directional indication based on a determination that the vehicle needs to make the directional indication when the vehicle enters the roundabout; and lead the turn signal of the vehicle to suspend the directional indication based on a determination that the turn signal does not need to make the direction indication when the vehicle enters the roundabout.

\* \* \* \* \*